United States Patent [19]

Sugasawa et al.

[11] Patent Number: 4,616,848
[45] Date of Patent: Oct. 14, 1986

[54] AUTOMOTIVE SUSPENSION CONTROL SYSTEM WITH VEHICLE SPEED-DEPENDENT DAMPING CHARACTERISTICS

[75] Inventors: Fukashi Sugasawa; Junsuke Kuroki; Yohsuke Akatsu, all of Yokohama, Japan

[73] Assignee: Nissan Motor Company, Limited, Yokohama, Japan

[21] Appl. No.: 771,766

[22] Filed: Sep. 3, 1985

[30] Foreign Application Priority Data

Sep. 6, 1984 [JP] Japan .................. 59-187152

[51] Int. Cl.$^4$ .......................................... B60G 11/00
[52] U.S. Cl. .................................. 280/707; 280/6 R; 180/41
[58] Field of Search ............ 280/707, 6 R, 6.1, 6.11, 280/6 H; 180/41

[56] References Cited

U.S. PATENT DOCUMENTS

| | | | |
|---|---|---|---|
| 4,162,083 | 7/1979 | Zabler et al. | 280/707 |
| 4,368,900 | 1/1983 | Beusse | 280/707 |
| 4,526,401 | 7/1985 | Kakizaki et al. | 280/707 |
| 4,564,214 | 1/1986 | Tokunaga et al. | 280/707 |
| 4,564,215 | 1/1986 | Kumagai et al. | 280/707 |
| 4,568,101 | 2/1986 | Bleustein et al. | 280/707 |

*Primary Examiner*—Richard A. Bertsch
*Attorney, Agent, or Firm*—Schwartz, Jeffery, Schwaab, Mack, Blumenthal & Evans

[57] ABSTRACT

A suspension control system includes a suspension system variable of stiffness and/or damping characteristics, a road sensor producing a road condition indicative signal and a controller for controlling the stiffness and/or damping characteristics of the suspension system depending upon the road condition indicative signal value and the vehicle speed indicative signal value. The controller is detective of the vehicle speed in a predetermined normal speed range which is defined by a lower speed criteria and an upper speed criteria, for generally maintaining the stiffness or damping characteristics of the suspension in relatively soft. The controller is detective of the vehicle speed indicative signal value smaller than the foregoing lower speed criteria to increase sensitivity of the road sensor and/or harden the suspension system at harder level than that in the normal speed range when the roughness of the road surface beyond a rough road criteria. Also, the controller is detective of the vehicle speed indicative signal value greater than the upper speed criteria for increasing sensitivity of the road sensor and/or harden the suspension system at harder level than that in the normal speed range when the roughness of the road surface beyond a rough road criteria, the relative displacement between a vehicle body and a road wheel, a vehicle speed sensor producing a vehicle speed indicative signal.

17 Claims, 19 Drawing Figures

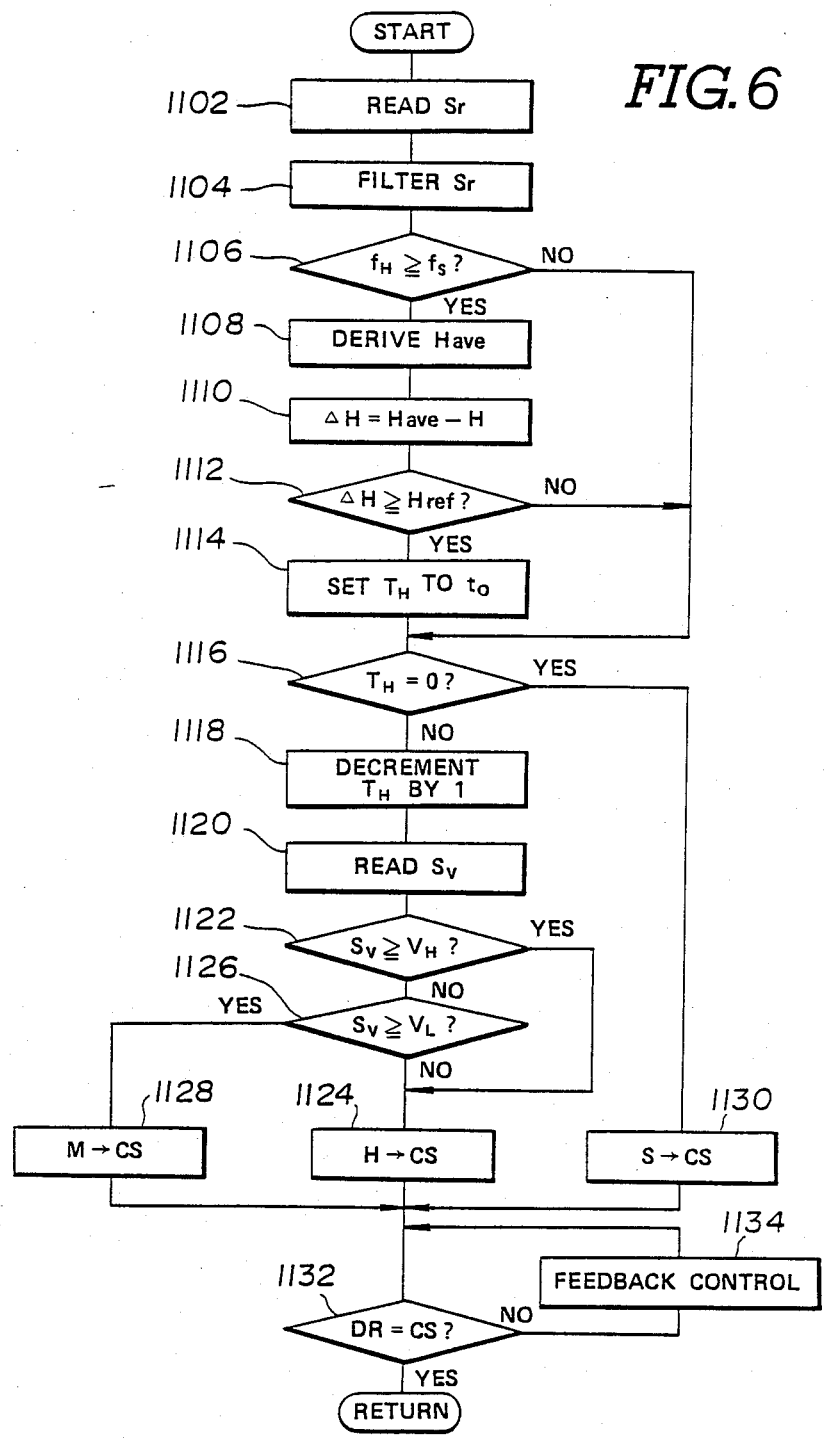

AUTOMOTIVE SUSPENSION CONTROL SYSTEM WITH VEHICLE SPEED-DEPENDENT DAMPING CHARACTERISTICS

BACKGROUND OF THE INVENTION

The present invention relates generally to a suspension control system for an automotive vehicle with variable damping characteristics of shock absorbing characteristics depending upon a vehicle speed. More specifically, the invention relates to a suspension control system which includes a sensor monitoring road surface conditions for use in controlling the stiffness of the suspension in accordance with roughness of the road surface, and which is variable of sensitivity of the road condition sensor or damping characteristics depending on the vehicle speed.

Various uses of road preview sensors have been proposed and developed. For example, SAE Technical Paper Ser. Nos. 630,750 an 800,520, respectively published on October, 1968 and February, 1980 show road preview sensors for use in suspension systems for obtaining optimum riding comfort and drivability. In addition, Japanese Patent First Publication No. 57-172808, published on Oct. 23, 1982 discloses a vehicle height control system which includes a sensor which detects rough road conditions and adjusts the vehicle height level depending upon road surface conditions. A vehicle height or level sensor is employed in the disclosed vehicle height control system for monitoring the relative displacement between the vehicle body and wheel axle. The output of the vehicle level sensor is compared with a reference level, which serves as a rough road criterion, and adjusts the vehicle height according to the result of judgement of the road surface conditions.

In another example, Japanese Patent First Publication No. 58-30542, published on Feb. 23, 1983, discloses a variable damping force shock absorber with damping characteristics varying in accordance with vehicle driving conditions. In the disclosed system the magnitude of relative displacement between the vehicle body and wheel axle is measured and a vehicle height variation indicative signal is derived from the measured displacement and the instantaneous vehicle speed. The vehicle height variation indicative signal value is compared with a reference value which serves as a staff suspension criterion for adjustment of the damping characteristics of the shock absorber in accordance therewith.

Such road sensors or preview sensors are effective for detecting road surface condition and controlling damping characteristics of the vehicular suspension for providing both of riding comfort and driving stability. On the other hand, as is well known, when the vehicle is driven in substantially low speed, pitching motion of the vehicle significantly degrades riding comfort. Likewise, when the vehicle speed is substantially high, harshness level of the suspension increases due to vibration of the road wheels if the damping force is not enough. Therefore, in such speed range, harder suspension is preferable for preventing pitching motion in substantially low vehicle speed and reducing harshness level in substantially high vehicle speed. Alternatively, when the vehicle speed is inbetween the substantially low and high speeds and thus within the normal speed range, e.g. 30 km/h to 80 km/h, hard suspension will give rough ride filing to degrade driving comfort. Whereas the conventional suspension control system employing the road sensor for controlling suspension characteristics depending on the road surface condition, can not adjust the sensitivity of the road sensor or damping characteristics depending on the vehicle speed. Therefore, the conventional systems have not been completely satisfactory in providing both of riding comfort and driving stability.

SUMMARY OF THE INVENTION

Therefore, it is an object of the invention to provide a suspension control system which resolves drawbacks in the prior art and can provide both riding comfort and drivability by providing vehicle speed dependent variation characteristics for road surface condition dependent suspension control.

A more specific object of the present invention is to provide a suspension control system which is variable of sensitivity of the road sensor and/or damping characteristics which is variable depending upon the road surface condition, depending upon the vehicle speed.

A further object of the invention is to provide a suspension control system which can maintain stiffness of the suspension soft enough to prevent rough ride feeling in a normal vehicle speed range.

In order to accomplish the aforementioned and other objects, a suspension control system, according to the invention, includes a suspension system variable of stiffness and/or damping characteristics, a road sensor producing a road condition indicative signal and a controller for controlling the stiffness and/or damping characteristics of the suspension system depending upon the road condition indicative signal value and the vehicle speed indicative signal value. The controller is detective of the vehicle speed in a predetermined normal speed range which is defined by a lower speed criteria and an upper speed criteria, for generally maintaining the stiffness of damping characteristics of the suspension in relatively soft. The controller is detective of the vehicle speed indicative signal value smaller than the foregoing lower speed criteria to increase sensitivity of the road sensor and/or harden the suspension system at harder level than that in the normal speed range when the roughness of the road surface beyond a rough road criteria. Also, the controller is detective of the vehicle speed indicative signal value greater than the upper speed criteria for increasing sensitivity of the road sensior and/or harden the susyepnsion system at harder level than that in the normal speed range when the roughness of the road surface beyond a rough road criteria. the relative displacement between a vehicle body and a road wheel, a vehicle speed sensor producing a vehicle speed indicative signal.

According to one aspect of the invention, a suspension control system for an automotive vehicle comprises a damper means interpositioned between a vehicle body and a road wheel for absorbing, at least in part, relative displacement between the vehicle body and the road wheel, the damper means having variable damper characteristics, a first sensor detecting roughness of the road surface and producing a first sensor signal having a value variable depending upon roughness of the road surface, a second sensor dtecting vehicle speed and producing a second sensor signal having a value variable depending upon vehicle speed, and a controller associated with the damper means for normally operating the latter in the first softer damping characteristics mode, the contrller being responsive to the second sensor signal for detecting the second sensor signal value within a given range representing a specific vehicle speed range, and varying variation characteristics of variable damping characteristics of the damper means in such a manner that, when the second sensor signal value is out of the given range, the controller derives sensing ability of road roughness and/or hardening magnitude of the variable damping characteristics damping means at relatively higher level, and when the second sensor signal value is within the given range, the controller derives sensing ability of road roughness and/or hardening magnitude of the variable damping characteristics damping means at relatively lower level.

According to another aspect of the invention, a suspension control system for an automotive vehicle comprises a damper means interpositioned between a vehicle body and a road wheel for absorbing, at least in part, relative displacement between the vehicle body and the road wheel, the damper means having variable damper characteristics variable between a first damping mode in which the damping means produced the highest damping force, a second damping mode in which the damping means produces the lowest damping force and a third damping mode in which damping force produced is lower than that produced in the first damping mode and higher than that produced in the second damping mode, a first sensor detecting roughness of the road surface and producing a first sensor signal having a value variable depending upon roughness of the road surface, a second sensor dtecting vehicle speed and producing a second sensor signal having a value variable depending upon vehicle speed, and a controller for selecting one of the damping modes of the damping means and operating the damping means into the selected one of the damping mode, the controller comparing the second sensor signal value with a first upper and second lower vehicle speed threshold, and deriving a road roughness indicative value on the basis of the first sensor signal value and comparing theroad roughness indicative value with a given reference value so as to select the first daming mode when the secopnd sensor signal value is greater than the first vehicle speed threshold or smaller than the second vehicle speed threshold and the road roughness indicative value is greater than the reference value and to select the third mode when the second sensor signal value is smaller than the first vehicle speed threshold and greater than the second vehicle speed threshold, and the road roughness indicative signal value is greater than the reference value.

According to a further aspect of the invention, a method for controlling damping characteristics of an automotive vehicle suspension system which includes a variable-damping-chracteristics daming means, comprising the steps of:

monitoring roughness of a road surface and producing a road roughness indicative signal having a value variable depending upon roughness of the road monitoring vehicle driving speed and producing a vehicle speed indicative signal having a value proportional to the vehicle speed, comparing the vehicle speed indicative signal value with a first higher speed threshold and a second lower vehicle speed threshold for distinguishing whether the vehicle speed is within a predetermined vehicle speed range defined by the first and second speed threshold, and controlling the variable-damping-characteristics into a first soft suspension mode when the roughness indicative signal value is smaller than a given reference value, into a second hard suspension mode when the roughness indicative signal value is greater than the reference value and the vehicle speed is out of the predetermined range, and into a third medium mode which has damping characteristics intermediate between the first soft mode and second hard mode, when the roughness indicative signal value is greater than the reference value and the vehicle speed is within the predetermined range.

BRIEF DESCRIPTION OF THE DRAWINGS

The following drawing, throughout which like numerals refer to like elements, may be of assistance in understanding the concepts behind the present invention and the structure, function and purpose of some preferred embodiments thereof:

FIG. 6 is a flowchart of a suspension control program to be executed by the suspension control system of FIG. 1;

DESCRIPTION OF THE PREFERRED EMBODIMENTS

Figure 1:
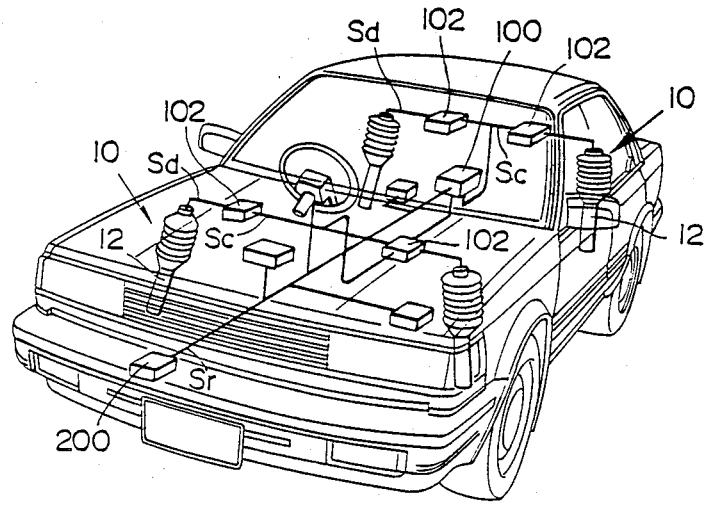
FIG. 1, a diagramatic illustration of major elements of a typical vehicular suspension system and of a first preferred embodiment of a suspension control system.

Referring now to the drawings, particularly to FIG. 1, the preferred embodiment of an electronic suspension control system in accordance with the present invention generally comprises suspension strut assemblies 10, each including a shock absorber 12 with variable shock-absorbing characteristics and a controller 100 adapted to produce a control signal for actuating an actuator (not shown in FIG. 1) in each shock absorber 12 in order to the adjust the shock-absorbing characteristics in accordance with the vehicle driving condition.

It should be appreciated that the term "shock-absorbing characteristics" or "damping characteristics" used throughout the disclosure refers to the quantitative degree to which a shock absorber produces damping force or spring force against bounding and rebounding motion of the vehicle body as a sprung mass and the road wheel assembly as unsprung mass, and pitching and rolling movement of the vehicle body relative to the road wheel assembly. In practice, the shock-absorbing characteristics can be controlled in various ways based on flow restriction between shock absorber working chambers disposed in shock absorber cylinders. In the shown embodiment, the flow restriction is variable by means of a flow control valve disposed within a reciprocable piston separating the chambers. The preferred embodiment described herebelow employs a shock absorber with three-way variable shock absorbing characteristics, i.e. HARD mode, SOFT mode and MEDIUM mode. Obviously, in HARD mode, the damping force generated in response to bounding or rebounding shock applied to the vehicle is the greatest among the foregoing three modes, in SOFT mode, the damping force generated in response to bounding or rebounding shock applied to the vehicle is the smallest among the foregoing three modes, and in MEDIUM mode, the damping force generated in response to bounding or rebounding shock applied to the vehicle is generally intermediate between that produced in HARD and SOFT modes.

Figure 2:
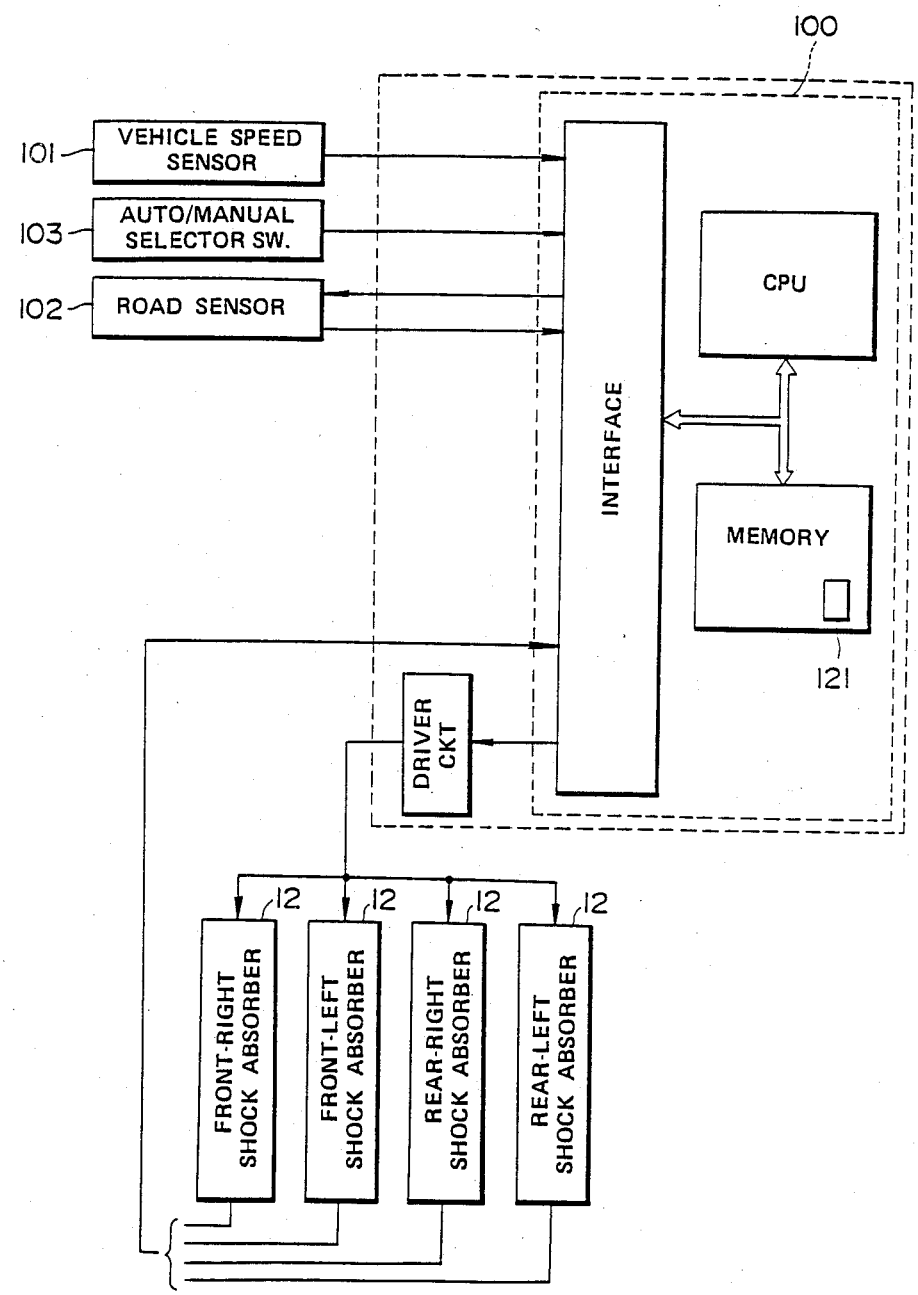
FIG. 2 is a more detailed block diagram of the suspension control system of FIG. 1.

Referring to FIGS. 1 and 2, the controller 100 is connected to a road surface sensor 200 which produces a sensor signal $S_r$ indicative of road surface conditions, which will be referred to hereinafter as "road sensor signal $S_r$". The controller 100 is also connected to a vehicle speed sensor 101 which produces a vehicle speed indicative signal $S_v$. The controller 100 may also be connected to sensors, such as, a brake switch, etc., in order to receive the sensor signals indicative of the suspension control parameters. The controller 100 is further connected to a manual selector switch 103 which is variable of the switch position between manual HARD mode position, manual MEDIUM mode position, manual SOFT mode position and AUTO mode position. When the manual selector switch 103 is placed in on of the manual HARD mode position, the manual MEDIUM mode position and the manual SOFT mode position, the controller 100 produces a control signal $S_c$ ordering one of the corresonding HARD, MEDIUM and SOFT mode. On the other hand, when the manual selector switch 103 is in the switch position of Auto mode position, the controller 103 derives the control signal ordering one of the HARD, MEDIUM and SOFT mode depending upon the suspension control parameters including the road surface condition and vehicle speed. The controller 100 is, in turn, connected to drive signal generators 102 which are responsive to the control signal $S_c$ from the controller, which control signal orders one of the HARD, MEDIUM and SOFT modes. The driver signal generator 102 produces a drive signal $S_d$ which actuates the shock absorber to one of the HARD, MEDIUM and SOFT mode positions.

Generally speaking, softer or lower damping-force characteristics are preferable from the standpoint of good driving comfort. Thus, when travelling along a relatively smooth road, the SOFT mode of the shock absorber is preferable. In addition, in order to absorb relatively high-frequency vibrations caused by an uneven road surface, a SOFT suspension is preferred. On the other hand, when the vehicle is travelling on a relatively rough or undulant road, the vehicle body may tend to bounce due to abrupt vertical displacements. In this case, pitch suppression becomes the most important factor for riding comfort and driving stability.

FIG. 2 shows the controller 100 which generally comprises a microprocessor. In practice, the microprocessor performs control operations not only depending upon the road surface conditions but also depending upon vehicle speed. The microprocessor 100 generally comprises an input interface 102, CPU 104, RAM 106, ROM 108 and output interface 110. In the shown embodiment, the microprocessor 100 is connected to the road sensor 200 via the input interface 102. The microprocessor 100 is also connected for input from a clock generator 112. RAM 106 includes a memory block 114 serving as a mode- indicative flag $F_{DH}$ which is set while the shock absorber is operating in HARD mode. ROM 108 includes a memory block 116 holding the road surface-dependent suspension control program as an interrupt program triggered at a given timing, e.g. every 20 msec. ROM 108 also has a memory block 118 storing a ultra- sonic sensor control program which triggers the ultra-sonic sensor at a given timing. The output interface 110 of the microprocessor 100 is connected for output of control signal $S_c$ to each of the driver signal generators.

Figure 3:
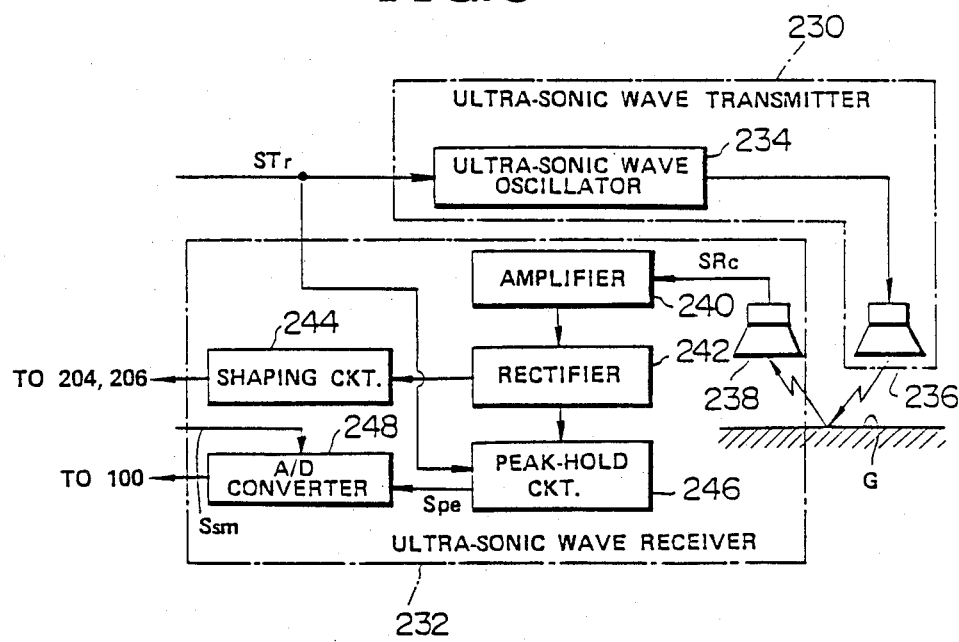
FIG. 3 is a more detailed block diagram of the ultrasonic sensor of FIG. 2.

As shown in FIG. 3, the ultra-sonic sensor 202 comprises generally an ultra-sonic wave transmitter 230 and a reflected ultra-sonic wave receiver 232. The transmitter 230 is associated with the controller 100 to receive therefrom a trigger signal $S_{Tr}$ at a given timing. The transmitter 230 includes an ultra-sonic oscillator 234 and an ulra-sonic wave transmitting section 236. The ultra-sonic oscillator 234 is responsive to the trigger signal $S_{Tr}$ from the controller 100, which is issued periodically or intermittently, to transmit or discharge ultra-sonic waves through the transmitter section 36 toward the road surface.

The ultra-sonic waves reflected by the road surface are received by a receiver section 238 of the receiver 232. The receiver section 238 produces a receiver signal $S_{Rc}$ having value varying in accordance with the amplitude of the received ultra-sonic waves. The receiver section 238 is connected to an amplifier 240 to supply the receiver signal $S_{Rc}$ to the latter. The receiver signal $S_{Rc}$ is amplified by the amplifier 240 and transmitted to a rectifier 242. The rectifier 242 is connected to the band-pass filters 204 and 206 as set forth above, through a shaping circuit 244. The rectifier 242 is also connected to a peak-hold circuit 246 which holds the peak value of the receiver signal. The peak-hold circuit 246 produces an analog peak-value indicative signal $S_{Pe}$ having a value proportional to the held peak value. The peak-hold circuit 246 is connected for output to the controller 100 via an analog-to-digital converter 248. The analog-to-digital converter 248 outputs a binary signal indicative of the peak-value-indicative signal value to the controller 100 as the road condition indicative signal $S_r$.

The peak-hold circuit 246 is also connected to the controller 100 to receive the trigger signal $S_{Tr}$. The peak-hold circuit 246 is responsive to the trigger signal from the controller to clear the currently held value.

Figure 4:
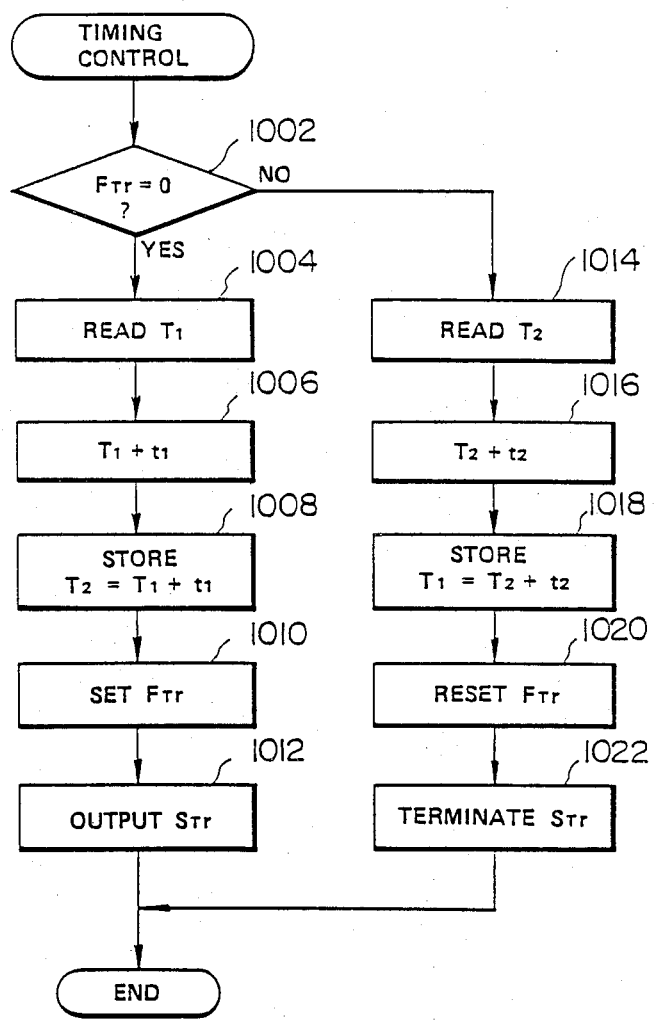
FIG. 4 is a flowchart of an ultrasonic sensor timing control program executed by the controller of FIG. 3.

FIG. 4 shows a timing control program executed by the controller 100 for controlling the trigger timing of the ultra-sonic sensor 200.

At the initial stage of execution of the timing control program, a trigger-signal-output-indicative flag $F_{Tr}$ in a memory block 120 of RAM is checked at a step 1002. The trigger signal $F_{Tr}$ is set when the trigger signal is output through the output interface 110 to the transmitter 230 and is reset when the trigger signal is not being output.

If the trigger signal-indicative flag $F_{Tr}$ is set when checked at the step 1002, then the timer value $T_1$ of a timer 122 in RAM is latched at a step 1004. The timer 122 continuously counts clock pulses from the clock generator 112. A trigger-signal-ON-time indicative time value $t_1$ is added to the latched timer value $T_1$ at a step 1006. The resultant value $(T_1+t_1)$, which serves as a trigger-signal-off time value, is transferred to and stored in a $T_2$-register 124 in RAM 106, at a step 1008. Then the flag $F_{Tr}$ is set at a step 1010. A HIGH-level output is applied to the output interface as trigger signal $S_{Tr}$ at a step 1012.

During the period $t_1$ starting from the time $T_1$, the potential at the output interface is held HIGH to continue application of the trigger signal $S_{Tr}$ to the transmitter 230. The timer 122 continues counting the clock pulses and produces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal-indicative flag $F_{Tr}$ was set at the step 1010 in the previous cycle of program execution, the answer at the step 1002 becomes "NO". Thus, control passes to a step 1014 in which the timer value $T_2$ of the second timer 124 is accessed in RAM 106. Similarly to the first-mentioned timer 122, the timer 124 continuously counts clock pulses from the clock generator 112. An OFF-interval-indicative time data $t_2$ is added to the latched timer value $T_2$ at a step 1016. The timer data $t_2$ has a value corresponding to a predetermined interval between successive trigger signals. The resultant time value $(T_2+t_2)$ is stored in the $T_1$-timer 122 of RAM 106 at a step 1018. Then, the flag $F_{Tr}$ is reset at a step 1020. After the step 1020, the output level at the output interface drops to LOW to terminate transmission of the trigger signal to the transmitter, at a step 1022.

In general, the value of the road condition indicative signal $S_r$ is compared with a reference value $S_{rave}$ which is an average value of the road condition indicative signal values. A difference $DS_r$ of the road condition indicative signal value $S_r$ and the reference value $S_{rave}$ is thus obtained. The difference $DS_r$ serves as the value indicative of the fluctuation of the vehicle level relative to the road surface and thus serves as a roughness indicative value. The difference $DS_r$ is compared with a road roughness threshold $S_{rref}$ so as to judge whether the roughness as represented by the difference $DS_r$ is greater than a hard suspension criteria as represented by the road roughness threshold $S_{rref}$. When the difference is greater than the road roughness threshold $S_{rref}$, the controller 100 produces the control signal $S_c$ ordering harder suspension.

Level of hardening of the suspension is variable depending upon the vehicle speed as represented by the vehicle speed indicative signal $S_v$ from the vehicle speed sensor 101. As set out in the introductory part of the disclosure, when the vehicle is driven in substantially low speed, pitching motion of the vehicle significantly degrades riding comfort. Likewise, when the vehicle speed is substantially high, harshness level of the suspension increases due to vibration of the road wheels if the damping force is not enough. Therefore, in such speed range, harder suspension is preferable for preventing pitching motion in substantially low vehicle speed and reducing harshenss level in substantially high vehicle speed. Alternatively, when the vehicle speed is inbetween the substantially low and high speeds and thus within the normal speed range, e.g. 30 km/h to 80 km/h, hard suspension will given rough ride feeling to degrade driving comfort.

Figure 5:
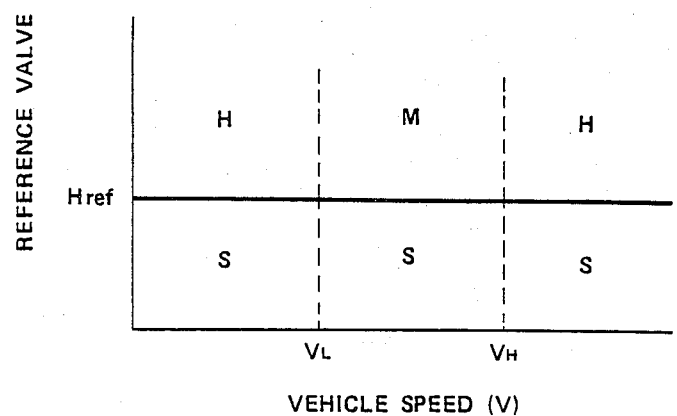
FIG. 5 shows variation damping characteristics of the suspension system according to the road surface condition and vehicle speed.

Therefore, hardening level of the suspension is varied as shown in FIG. 5. In order to define the normal vehicle speed range, a lower vehicle speed threshold value $V_L$ and an upper vehicle speed threshold value $V_H$ are preset in the controller 100. For example, the lower vehicle speed threshold $V_L$ is set about 30 km/h and the upper vehicle speed threshold $V_H$ is set at about 70 to 80 km/h.

As apparent from FIG. 5, when the difference $DS_r$ is smaller than the road roughness threshold $S_{rref}$, the suspension system is held at SOFT mode in any vehicle speed range. On the other hand, when the difference $DS_r$ is greater than the road roughness threshold $S_{rref}$ and the vehicle speed indicative signal value is smaller than the lower vehicle speed threshold $V_L$ or greater than the upper vehicle speed threshold $V_H$, the suspension system is operated into HARD mode. When the difference $DS_r$ is greater than the road roughness threshold $S_{rref}$ and the vehicle speed indicative signal value is inbetween the lower and upper vehicle speed thresholds, the suspension system is operated into MEDIUM mode.

FIG. 6 shows a flowchart of the suspension control program for controlling the stiffness or hardness of the suspension according to the characteristics of FIG. 5. Immediately after starting execution of the suspension control program, the value of the road sensor signal Sr is read out at a step 1102. The read road sensor signal value Sr is processed in a digital band-pass filtering process for picking up relatively high-frequency component $f_h$ in a resolution range of the vehicular wheel, e.g. 1.8 Hz to 4 Hz, at a step 1104. Thereafter, at a step 1006, an amplitude of the high-frequency component $f_h$ is compared with a predetermined reference value $f_s$. When the amplitude of the high-frequency component $f_h$ is equal to or greater than the reference value $f_s$, an average vehicle height $H_{ave}$ relative to the road surface is derived and updated, at a step 1108. In practice, average value $H_{ave}$ of the road sensor signal value H is calculated by adding a value derived from the instantaneous road sensor signal value H according to the following equation:

$$H_{ave} = H_{aveO} + 1/64 \cdot (H - H_{aveO})$$

where $H_{aveO}$ is the average value of the road sensor signal vavlue derived in the immediately preceding cycle of program execution.

At a step 1110, $(H-H_{ave})$ is calculated in order to derive a difference value $\Delta H$. The derived difference value $\Delta H$ is compared with a predetermined reference value $H_{ref}$ which is representative of a harder suspension criteria, at a step 1112. When the difference value $\Delta H$ is equal to or greater than the reference value $H_{ref}$, a timer 121 is set by the predetermined value $t_o$ at a step 1114.

At a step 1116, the value $T_H$ of the timer 121 is checked fo checking time-up. The timer value $T_H$ is adapted to become zero. When the timer value $T_H$ is greater than zero, the timer value is declemented by a predetermined value, i.e. 1, at a step 1118. Thereafter, the vehicle speed indicative signal value $S_v$ is read out at a step 1120. The vehicle speed indicative signal value $S_v$ is compared with the higher vehicle speed threshold $V_H$, at a step 1122. If the vehicle speed indicative signal value $S_v$ is equal to or greater than the higher vehicle speed threshold $V_H$, the control signal $S_c$ ordering HARD mode is output at a step 1124. On the other hand, when vehicle speed indicative signal value $S_v$ is smaller than the higher vehicle speed threshold $V_H$, the vehicle speed indicative signal value is compared with the lower vehicle speed threshold $V_L$ at a step 1126. When the vehicle speed indicative signal value $S_v$ is smaller than the lower vehicle speed threshold $V_L$, then process goes to output the control signal $S_c$ ordering the HARD mode.

On the other hand, when the vehicle speed indicative signal value $S_v$ is equal to or greater than the lower vehicle speed threshold $V_L$, the process goes to a step 1128 to output the control signal $S_c$ ordering the MEDIUM mode.

When the high-frequency component $f_h$ is smaller than the reference value $f_s$ as checked to the step 1106 or when the difference value $\Delta H$ is smaller than the reference value $H_{ref}$, process jumps to the step 1116. On the other hand, when the timer value $T_H$ is zero as checked at the step 1116, process goes to a step 1130 to output the control signal $S_c$ ordering SOFT mode.

After one of the steps 1124, 1128 and 1130, the process goes to a step 1132. In the step 1132, the valve position indicative signal values $S_\theta$ from the valve position sensors 448, each of which is adapted to detect the corresponding valve position of the variable-damping-characteristics shock absorber described in deatil later, are compared with the control signal. When the valve position indicative signal value $S_\theta$ matches the control signal value, then process goes END. On the other hand, if the valve position indicative signal value $S_\theta$ does not match with the control signal value, then process goes to activate the driver signal generator to drive the valve to the valve position ordered by the control signal.

FIGS. 7 to 10 show the preferred embodiment of the variable-damping-characteristic shock absorber to be employed in the suspension control system according to the invention. In this embodiment, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 304 reciprocally housed within the inner cylinder 302 and defining upper and lower fluid chambers 316 and 318 therein.

The piston 314 has fluid passages 320 and 322 connecting the upper and lower fluid chambers 316 and 318. The piston 214 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed position. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 328 prevents fluid flow through the fluid passage 320. On the other hand, during the piston compression stroke, i.e. during bounding movement of the suspension, the fluid passage 320 is active, allowing fluid flow from the lower fluid chamber 318 to the uppe fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

Figure 8:
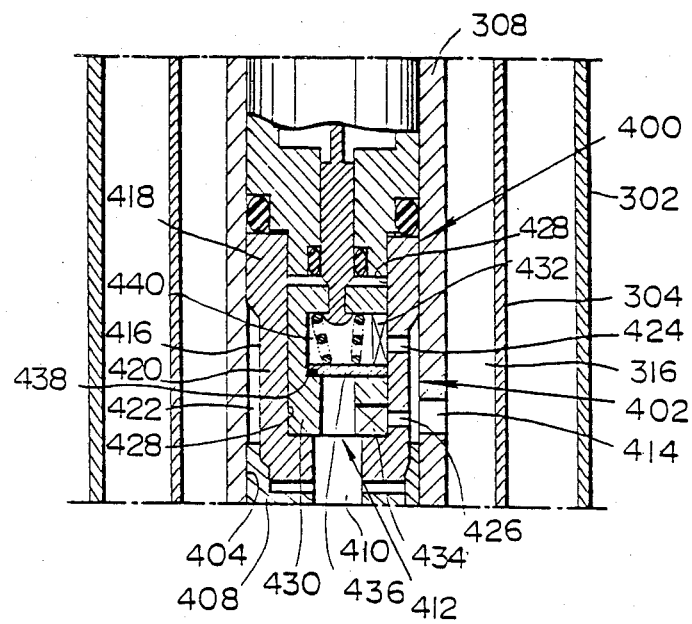
FIG. 8 is a partial and enlarged longitudinal section of the major part of the first embodiment of the shock absorber of FIG. 7.

As shown in FIG. 8, the piston rod 308 defines an axially extending through opening 404 with the lower end opening into the lower fluid chamber 318. A fitting 408 seals the lower end of the opening 404 of the piston rod and has axially extending through opening 410, the axis of which is parallel to the axis of the through opening 404 of the piston rod. Thus, the through openings 404 and 410 constitute a fluid path 412 extending through the piston rod. The piston rod 308 also has one or more radially extending orifices or openings 414 opening into the upper fluid chamber 316. Thus, the upper and lower fluid chambers 316 and 318 are in communication through the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radialy extending orifices 432 and 434 are defined in the rotary valve member 430 at positions opposite the orifices 424 and 426 of the stationary valve member 416.

As shown in FIGS. 11(A) and 11(B), the orifices 424 and 426 respectively include first, second and third orifices 424a, 424b, 424c, and 426b, 426c. The first orifice 424a has the narrowest cross-sections and the orifices 432 and 434 are adapted to be in alignment with the first orifices to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426b are intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This cause the bound damping force to be somewhat weaker than the rebound damping force.

Figure 10:
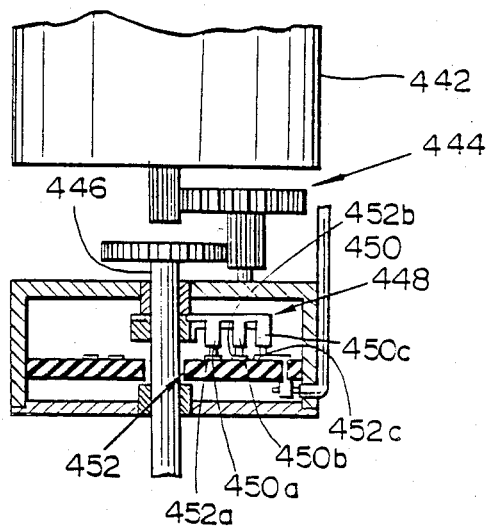
FIG. 10 is an enlarged elevation in partial section of actuating elements of the mechanism shown in FIG. 12.

The rotary valve member 430 is associated with an electrically operable actuator such as an electrical step motor 442 through a differential gear unit 444 and an output shaft 446 as shown in FIG. 10. A potentiometer 448 which serves as the foregoing valve position sensor for producing the valve position indicative signal representative of the operation mode position of the rotary valve member 430 and whereby represents one of HARD, MEDIUM and SOFT modes, is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the statioary contact, the potentiometer 448 produces a mode signal representative of the rotary valve position and thus indicative of the selected mode of the damping force adjusting mechanism. The step motor 442 is electrically connected to a controller 110 to receive the control signal as a mode selector signal which drive the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 7, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

Figure 9A:
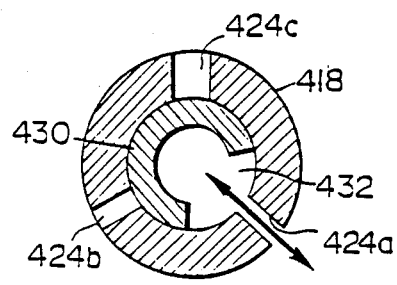
FIG. 9(A) and (B), cross-sections through the mechanism shown in FIG. 8 at positions revealing the three possible fluid flow paths.
Figure 9B:
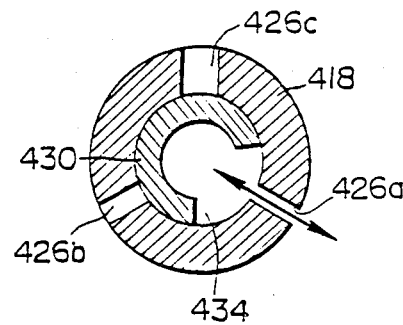

The operation of the damping force adjusting mechanism 400 will be bnriefly described herebelow with reference to FIGS. 9. FIGS. 9(A) and 9(B) show the case of the HARD mode. In this case, the orifice 432 of the rotary valve 430 is in alignment with the orifice 424a. On the other hand, the orifice 434 is blocked fluid communication to the lower fluid chamber by the rotary valve periphery. During vehicle rebounding motion, i.e., in the piston compression stroke, the fluid flows from the upper fluid chamber 316 to the lower fluid chamber 318 only through the fluid passage 322. On the other hand, during vehicle bounding motion, the fluid flows from the lower fluid chamber 318 to the upper fluid chamber 316 through orifices 424a and through the fluid passage 320. Since the first orifice 424a is the narrowest, the damping force produced in this mode is the highest among the three selectable modes. In addition, since the fluid flow area for the fluid floe from the upper fluid chamber 316 to the lower fluid chamber 318 is smaller than that for the fluid from the lower fluid chamber to upper fluid chamber, damping characteristics produced by the shock absorber in response to bounding and rebounding.

In the case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

Figure 11:
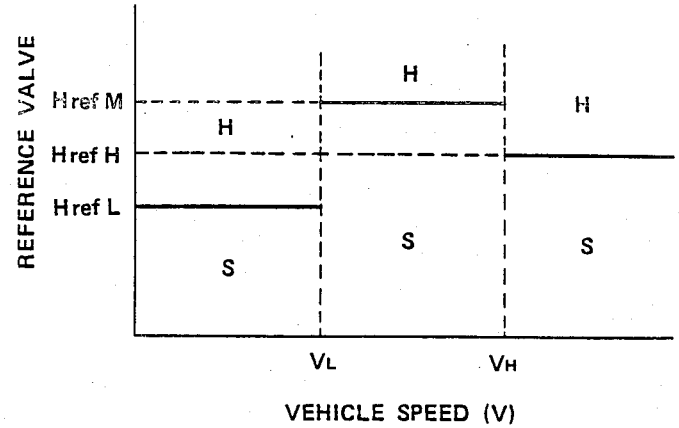
FIG. 11 shows variation damping characteristics of the suspension system according to the road surface condition and vehicle speed, in accordance with the second embodiment of the invention.
Figure 7:
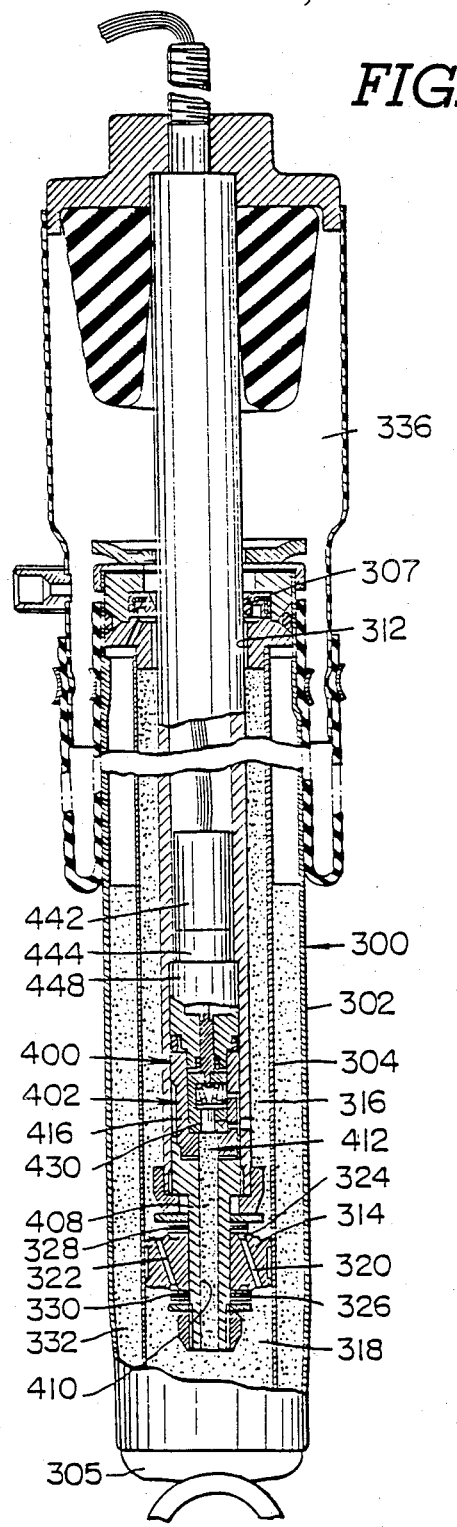
FIG. 7 is a longitudinal section through a shock absorber used in the first preferred embodiment.

FIG. 11 shows a table of alternative embodiment of the suspension control system according to the present invention, in which damping or shock absorbing characteristics is variable not only depending on the road surface condition but also depending on the vehicle speed. In this alternative embodiment, the reference value $H_{ref}$ is varied depending upon the vehicle speed. As will be understood from the table of FIG. 11, when the vehicle speed is lower than the lower vehicle speed threshold $V_L$, the smallest reference value $H_{refL}$ is used. When the vehicle speed is higher than the higher vehicle speed threshold $V_H$, the medium reference value $H_{refM}$ is used. On the other hand, when the vehicle speed is in a normal speed range inbetween the lower vehicle speed threshold $V_L$ and the higer vehicle speed threshold $V_H$, the highest reference value $H_{refH}$ is used. In the procedure, when the difference value $\Delta H$ is equal to or greater than the reference value $H_{ref}$ selected depending on the vehicle speed, HARD mode position of the variable-daming-characteristics shock absorber 12 is ordered. Otherwise, the shock absorber 12 is maintained at SOFT mode position.

Figure 12:
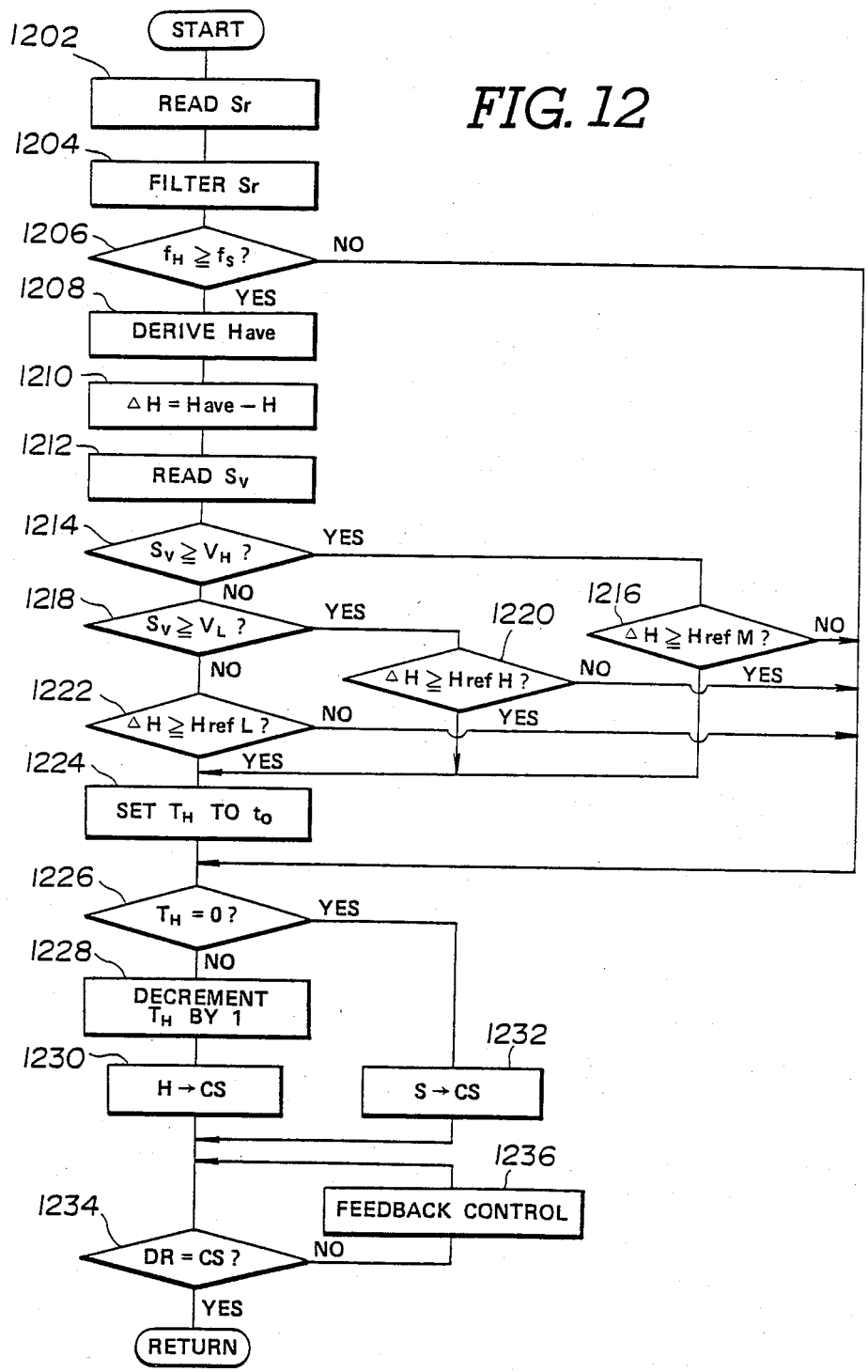
FIG. 12 is a flowchart of a suspension control program to be executed for controlling the damping characteristics of the suspension system according to the characteristics of FIG. 11.

FIG. 12 shows a flowchart of the susopension control program for performing suspension control according to the schedule defined in the table of FIG. 11.

Immediately after starting execution of the suspension control program, the value of the road sensor signal Sr is read out at a step 1202. The read road sensor signal value Sr is processed in a digital band-pass filtering process for picking up relatively high-frequency component $f_h$ in a resolution range of the vehicular wheel, e.g. 1.8 Hz to 4 Hz, at a step 1204. Thereafter, at a step 1206, an amplitude of the high-frequency component $f_h$ is compared with a predetermined reference value $f_s$. When the amplitude of the high-frequency component $f_h$ is equal to or greater than the reference value $f_s$, an average vehicle height $H_{ave}$ relative to the road surface is derived and updated, at a step 1208.

At a step 1210, $(H - H_{ave})$ is calculated in order to derive a difference value $\Delta H$. Then, the vehicle speed indicative signal value $S_v$ is read out at a step 1212. The read vehicle speed indicative signal value $S_v$ is compared with the higher vehicle speed threshold $V_H$ at a step 1214. When the vehicle speed indicative signal value $S_v$ is equal to or greater than the higher vehicle speed threshold $V_H$, then the difference value $\Delta H$ is compared with the medium reference value $H_{refM}$ at a step 1216. On the other hand, when the vehicle speed indicative signal value $S_v$ is smaller than the higher vehicle speed threshold $V_H$, then the vehicle speed indicative signal value $S_v$ is compared with the lower vehicle speed threshold $V_L$ at a step 1218. When the vehicle speed indicative signal value $S_v$ is smaller than the lower vehicle speed threshold $V_L$, then the difference value $\Delta H$ is compared with the lowest reference value $H_{refL}$ at a step 1220. On the other hand, when the vehicle speed indicative signal value $S_v$ is equal to or greater than the higher vehicle speed threshold $V_L$, the difference value $\Delta H$ is compared with the highest reference value $H_{refH}$ at a step 1222.

When the difference value $\Delta H$ is equal to or greater than the reference value $H_{ref}$ as checked at one of the steps 1216, 1220 and 1222, a timer 121 is set by the predetermined value $t_o$ at a step 1224.

At a step 1226, the value $T_H$ of the timer 121 is checked for checking time-up. The timer value $T_H$ is adapted to become zero. When the timer value $T_H$ is greater than zero, the timer value is declemented by a predetermined value, i.e. 1, at a step 1228. Thereafter, The control signal $S_c$ ordering the HARD mode is output at a step 1230.

When the high-frequency component $f_h$ is smaller than the reference value $f_s$ as checked to the step 1206 or when the difference value $\Delta H$ is smaller than the reference value $H_{ref}$, process jumps to the step 1226. On the other hand, when the timer value $T_H$ is zero as checked at the step 1226, process goes to a step 1232 to output the control signal $S_c$ ordering SOFT mode.

After one of the steps 1230 and 1232, the process goes to a step 1132. In the step 1234, the valve position indicative signal values $S_\theta$ from the valve position sensors 448, each of which is adapted to detect the corresponding valve position of the variable-damping-characteristics shock absorber described in detail later, are compared with the control signal. When the valve position indicative signal value $S_\theta$ matches the control signal value, then process goes END. On the other hand, if the valve position indicative signal value $S_\theta$ does not match with the control signal value, then process goes to activate the driver signal generator to drive the valve to the valve position ordered by the control signal.

In the alternative, damping characteristics or stiffness of the suspension can be varied not only by varing damping characteristics of the shock absorber. For example, the stiffness of the suspension can be adjusted by adjusting stiffness of a roll stabilizer. The roll stabilizer applicable for suspension control as set forth above will be described herebelow with reference to FIGS. 13 to 15.

Figure 13:
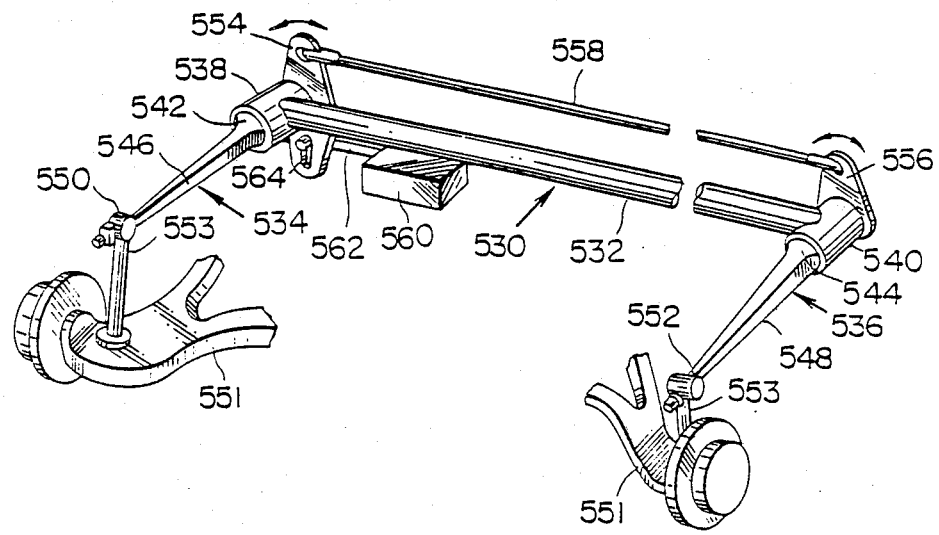
FIG. 13 is a perspective illustration of a stabilizer which constitutes the alternative embodiment of the suspension control system according to the invention.
Figure 14:
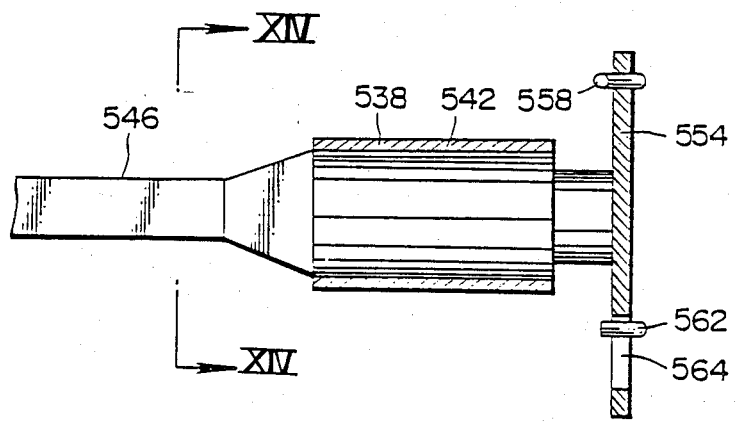
FIG. 14 is an enlarged section of a major part of the stabilizer of FIG. 12.
Figure 15:
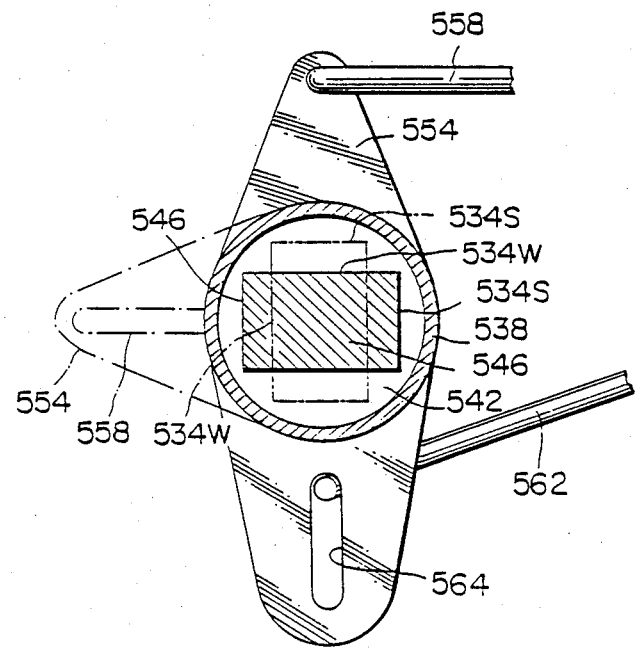
FIG. 15 is a cross-section taken along line XIV—XIV of FIG. 13.

FIGS. 12 to 14 show the structure of a roll stabilizer 530 to be controller by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearing sections 538 and 540 at both ends. The parallel bar sections 534 and 536 have end segments 542 and 544 of circular cross-section adapted to rotatably engage the bearings 538 and 540 of the transverse bar section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 or 536.

The cylindrical cross-section end segments 542 and 544 of the parallel bar sections 534 and 536 extend beyond the ends of the bearing portion 538 and 540. Link plates 554 and 556 are rigidly fitted onto the protruding ends of the parallel bar sections 534 and 536. The link plates 554 and 556 are rotatable about the bearing sections 538 and 540 together with the parallel bar sections 534 and 536. The link plates are connected to each other through a linkage 558. In addition, the link plate 554 is associated with an actuator 560 through an actuation rod 562 engaging an elongated opening 564 of the link plate 554. The actuator 560 may comprise an electromagnetically operative solenoid. The actuator is adapted to be energized by a control signal fed from a controller 100 to rotate the link plate 554 along with the parallel bar section 534 through 90° from the shown neutral position. When the actuator 560 is energized, the like plate 556 is also rotated according to rotation of the link plate 554 to pivot the parallel bar 536 through 90° within the bearing section 540.

As shown in FIG. 14, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position, the bending stress on the parallel bar sections 534 and 536 is increased, i.e., the torsion on the transverse bar section 532 of the stabilizer is increase.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabiizer 530 is held in this position as long as the road surface condition indicative siginal value remains less than the threshold value which is also derived in accordance with the vehicle speed.

When the roughness of the road surface exceeds the threshold value, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

Figure 16:
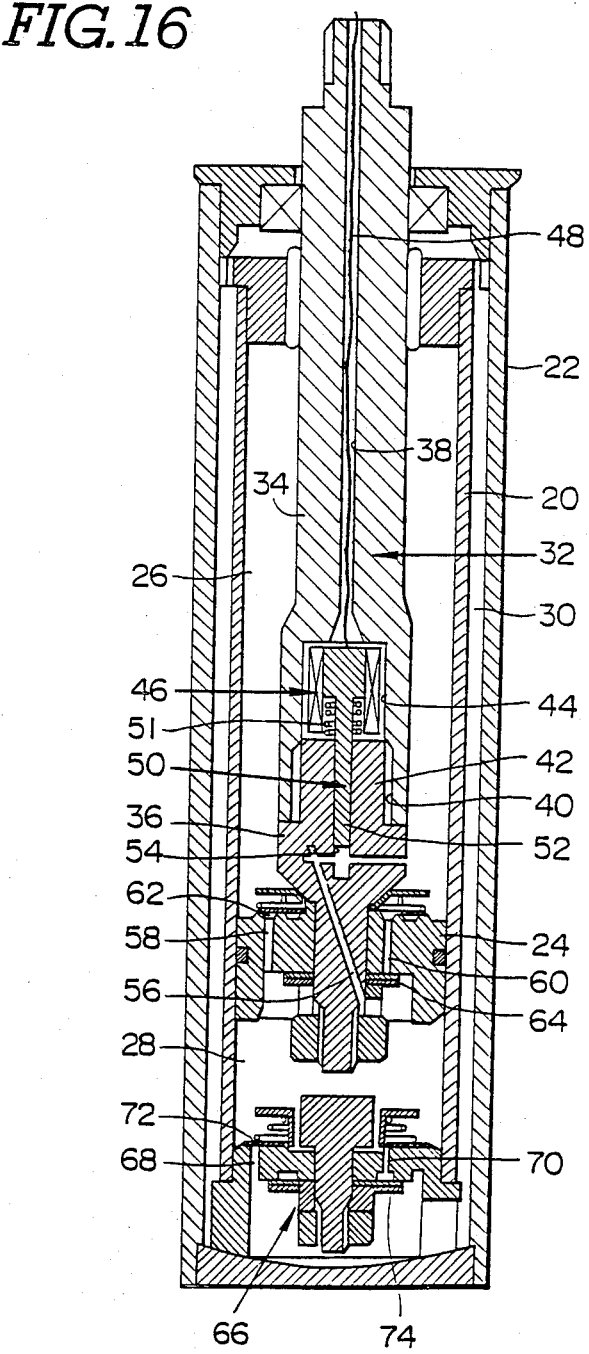
FIG. 16 is a section of a shock absorber serving as the variable damper employed in the further alternative embodiment of the suspension system.

For performing the suspension control according to the procedure as set forth above, not only the three-way variable-damping-characteristic shock absorber but also a two-way variable-damping characteristics shock absorber can be used. Example of the two-way variable-damping characteristics shock absorber is illustrated herebelow with reference to FIG. 16. In the example, the shock absorber 12 generally comprises an inner and an outer hollow cylinders 620 and 622 arranged coaxially, and a piston 624 fitting flush within the hollow space in the inner cylinder 620, as shown in FIG. 2. The piston 624 defines upper and lower fluid chambers 626 and 628 within the inner cylinder 620. The inner and outer cylinders define an anular fluid reservoir chamber 630.

The piston 624 is connected to the vehicle body (not shown) by means of a piston rod which is generally referred to by the reference number 632. The piston rod 632 is formed with an axially extending through opening 638.

The piston 624 defines flow-restrictive fluid passages 658 and 660. The upper end of the fluid passage 658 is closed by a resilient flow-restricting valve 662. Similarly, the lower end of the fluid passage 660 is closed by a flow-restricting valve 664. The flow-restricting valves 662 and 664 serve as check valves for establishing one-way fluid communication in opposite directions. In addition, since the flow-restriction valves 662 and 664 are biased toward the ends of the fluid passages 658 and 660, they open to allow fluid communication between the upper and lower fluid chambers 626 and 628 only when the fluid pressure difference between the upper and lower chambers 626 and 628 overcomes the effective pressure of the valves.

The piston 624 has a central through opening 624a. Upper end of the opening 624a is adapted to engage with the lower end of the piston rod 632. The lower end of the opening 624a is adapted to receive the upper end of a sleeve 652. The sleeve 652 has an axially extending bore 652a to thrustingly receive a flow control valve spool 655 and a plurality of radially extending orifices 654. The sleeve 652 is further formed with an annular groove 660b extending along the inner periphery thereof. The radially extending orifices 654 exposes its inner ends to the annular groove 660b. The outer ends of the orifices 654 opens toward the lower fluid chamber 628.

The valve spool 655 is formed with annular groove 660a on the outer periphery thereof. The annular groove 660a is in communication with the upper fluid chamber 626 through a fluid passage 656 defined through the piston body and the sleeve. The annular groove 660a is located at a vertical position at which it mates with the annular groove 660b of the sleeve 652 at the lower position of the spool and is shifted away from the annular groove 660b at the upper position of the spool.

The spool 655 is normally biased upwardly by means of a bias spring 646d of an actuator 646 which comprises an electromagnetic coil 646a housed in an enclosed casing 646b and a yoke 646c. The casing 646b engages with the sleeve 652 at the upper end thereof so that the actuator 646 can be firmly mounted on the piston 624. When the electromagnetic coil 646a is energized, it pulls the spool 655 downwardly to place the spool at its lower position.

When the spool is in the lower position, fluid communication between the upper and lower fluid chambers 626 and 628 through the fluid passage 656, the grooves 650a and 660b and orifices 654. Therefore, total flow path area for allowing fuid communication between the upper and lower chambers 626 and 628 becomes bigger. As a result, flow restriction become smaller to soften damping characteristics of the vehicle. On the other hand, when the spool is in the upper position as shown in FIG. 13, fluid communication between the upper and lower fluid chambers 626 and 628 through the fluid passage 656 is blocked. Therefore, at this position, fluid communication between the upper and lower fluid chambers 626 and 628 are established only by one of the fluid passages 56 and 68. Thus fluid flow area become smaller to provide higher flow restriction.

Therefore, the damping characteristics of the shock absorber 12 become harder.

Figure 17:
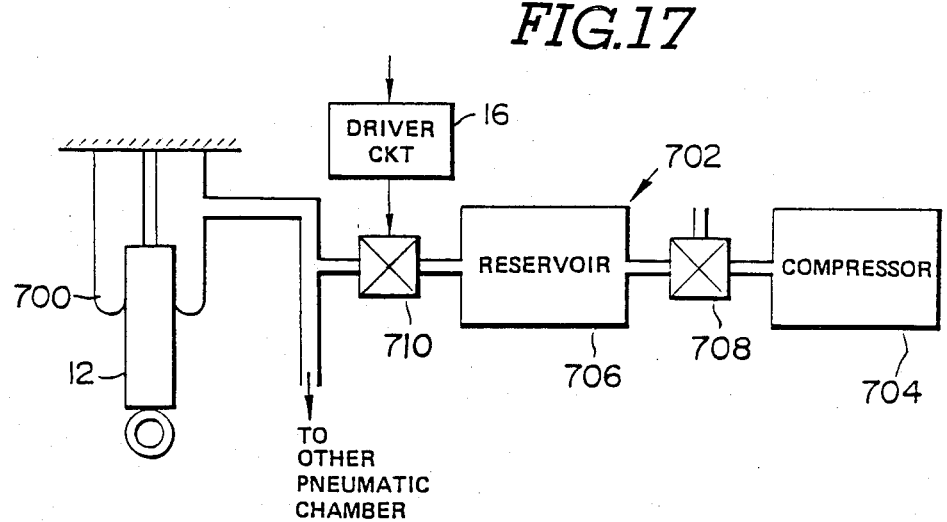
FIG. 17 is a schematic diagram of another embodiment suspension control system, to which the road condition dependent suspension control of the first to third embodiment is applicable.

In the further alternative, the variable damping characteristics of the suspension can be achieved by controlling pneumatic vehicle height control system. FIG. 17 shows the alternative embodiment of the suspension control system employing the pneumatic vehicle height control system. In this embodiment, a known vehicle height control system is used for hardness control of the suspension. Such vehicle height control U.S. Pat. No. 4,349,077 to Sekiguchi et al, U.S. Pat. No. 4,327,936 to Sekiguchi systems have been disclosed in U.S. Patent and European Patent First Publication No. 0 114 700, published on Aug. 1, 1984, for example. Detailed constructions of the suspension system with vehicle height control as disclosed in the above-reference publications are hereby incorporated by reference for the sake of disclosure.

In the shown system, an expandable and contractable pneumatic chamber 700 is formed above the shock absorber 702. The pneumatic chamber 700 is connected to a pressurized pneumatic fluid source 704. The fluid source 704 comprises a compressor 706 for pressurizing a fluid such as air, a reservoir tank 708 connected to the compressor 706 through an induction valve 710, and a pressure control valve 712. The pressure control valve 712 and the induction valve 710 are connected to the driver signal generator 102 to be controlled thereby.

According to the shown embodiment, the driver circuit 102 is connected to the controller 100. When energized by the driver signal, pressure control valve 612 closes to block pneumatic fluid communication between the pneumatic chamber 700 and the fluid reservoir 708. As a result, the effective volume of the pneumatic chamber 700 is precisely that of the pneumatic chamber itself. Since the damping characteristics due to the pneumatic pressure in the pneumatic chamber is related to the effective volume of the pneumatic chamber and a smaller effective volume is achieved by blocking fluid communication between the pneumatic chamber and the fluid reservoir, the pneumatic chamber becomes relatively rigid in this case, providing a larger damping force in response to vehicle body-chassis displacement.

On the other hand, in the normal valve position, the pressure control valve 712 opens to allow fluid communication between the pneumatic chamber and the fluid reservoir. As a result, the effective volume becomes equal to the sum of the volumes of the pneumatic chamber and the fluid reservoir. By providing a larger effective volume, the damping characteristics of the pneumatic chamber are weakened.

Figure 18:
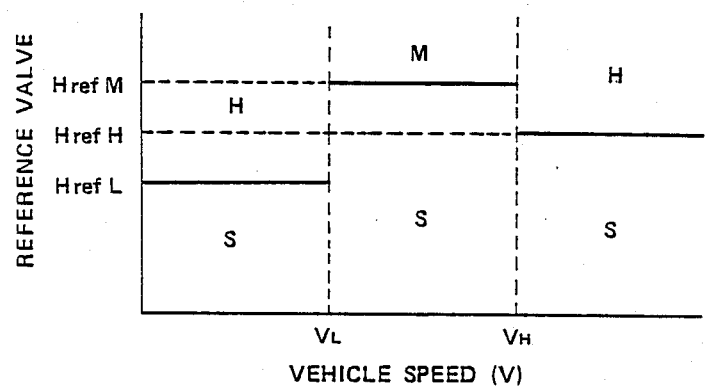
FIG. 18 shows variation damping characteristics of the suspension system according to the road surface condition and vehicle speed, in accordance with the third embodiment of the invention.

FIG. 18 shows an alternative procedure in controlling stiffness of the suspension. In this embodiment, damping characteristics is varied depending upon the vehicle speed similarly to the characteristicas of FIG. 5 and the reference value $H_{ref}$ varied similarly to that of FIG. 11.

As set forth above, according to the present invention, the vehicular suspension system can provide both riding comfort and good drivability by controlling hardness of the suspension depending upon the road surface conditions and the vehicle speed.

What is claimed is:

1. A suspension control system for an automotive vehicle comprising:

a damper means interpositioned between a vehicle body and a road wheel for absorbing, at least in part, relative displacement between the vehicle body and the road wheel, said damper means having variable damper characteristics;

a first sensor detecting roughness of the road surface and producing a first sensor signal having a value variable depending upon roughness of the road surface;

a second sensor detecting vehicle speed and producing a second signal having a value variable depending upon vehicle speed; and a controller associated with said damper means for normally operating the latter in said first softer damping characteristics mode, said contrller being responsive to said second sensor signal for detecting the second sensor signal value within a given range representing a specific vehicle speed range, which given range being defined by an upper reference value representative of an upper vehicle speed criteria and a lower reference value representative of a lower vehicle speed criteria, comparing said second sensor signal value with said upper and lower reference values to determine whether the vehicle speed is within said given range or not, and varying variation characteristics of variable damping characteristics of said damper means in such a manner that, when said second sensor signal value is out of said given range, said controller derives sensing ability of road roughness and/or hardening magnitude of said variable damping characteristics damping means at relatively higher level, and when said second sensor signal value is within said given range, said controller derives sensing ability of road roughness and/or hardening magnitude of said variable damping characteristics damping means at relatively lower level.

2. The suspension control system as set forth in claim 1, wherein said damping means is variable of its damping characteristics between said first softer damping characteristics mode, a second harder damping characteristics mode and a third medium damping characteristics mode, and said controller selects said second harder damping characteristics mode when relatively higher level of hardening magnitude is ordered on the basis of said first and second sensor signal values, and said third medium damping characteristics mode when relatively lower level of hardening magnitude is ordered.

3. The suspension control system as set forth in claim 2, wherein said controller comparing said first sensor signal value with a given reference value to harden said damping means when said first sensor signal value is greater than said reference value, in order to order said relatively higher level hardening magnitude when said second sensor signal value is out of said given range and to order said relatively lower level hardening magnitude when said second sensor signal value is within said given range.

4. The suspension control system as set forth in claim 1, wherein said controller compares said first sensor signal value with a given reference value which is variable between a first lower value, a second higher value and a third medium value greater than said first lower value and smaller than said second higher value in order to harden said damping force when said first sensor value is greater than selected one of said first lower, second harder and third medium values.

5. The suspension control system as set forth in claim 4, wherein said controller compares said second sensor signal value with a first threshold value representative of the higher speed criteria of said given range and a second threshold value representative of the lower speed criteria of said given range for distinguishing said second sensor value within and outside of said given range.

6. The suspension control system as set forth in claim 5, wherein said controller compares said first sensor signal value with said first lower value when said second sensor signal value is smaller than said second threshold value, with said second higher value when said second sensor signal value is within said given range and with said third medium value when said second sensor signal value is greater than said first threshold value.

7. The suspension control system as set forth in claim 6, wherein said sensor is an ultra-sonic sensor transmitting ultra-sonic waves towards a road surface, receiving ultra-sonic waves reflected by the road surface and producing said sensor signal representative of the interval between transmission and reception of ultra-sonic waves.

8. The suspension control system as set forth in claim 7, wherein said damper means comprises a hydraulic shock absorber including a reciprocating piston disposed within a shock absorber housing, said piston having a wave means which can be operated by said control signal to adjust the resistance to flow of working fluid in said cylinder therethrough.

9. The suspension control system as set forth in claim 1, wherein said sensor is an ulra-sonic sensor transmitting ultra-sonic waves towards a road surface, receiving ultra-sonic waves reflected by the road surface and producing said sensor signal representative of the interval between transmission and reception of ultra-sonic waves.

10. The suspension control system as set forth in claim 1, wherein said damper means comprises a hydraulic shock absorber including a reciprocating piston disposed within a shock absorber housing, said piston having a valve means which can be operated by said control signal to adjust the resistance to flow of working fluid in said cylinder therethrough.

11. A suspension control system for an automotive vehicle comprising:
  a damper means interpositioned between a vehicle body and a road wheel for absorbing, at least in part, relative displacement between the vehicle body and the road wheel, said damper means having variable damper characteristics variable between a first damping mode in which said damping means produced the highest damping force, a second damping mode in which said damping means produces the lowest damping force and a third damping mode in which damping force produced is lower than that produced in said first damping mode and higher than that produced in said second damping mode;
  a first sensor detecting roughness of the road surface and producing a first sensor signal having a value variable depending upon roughness of the road surface;
  a second sensor dtecting vehicle speed and producing a second sensor signal having a value variable depending upon vehicle speed; and
  a controller for selecting one of said damping modes of said damping means and operating said damping means into said selected one of said damping mode, said controller comparing said second sensor signal value with a first upper and second lower vehicle speed threshold, said deriving a road roughness indicative value on the basis of said first sensor signal value and comparing said road roughness indicative value with a given reference value so as to select said first daming mode when said secopnd sensor signal value is greater than said first vehicle speed threshold or smaller than said second vehicle speed threshold and said road roughness indicative value is greater than said reference value and to select said third mode when said second sensor signal value is smaller than said first vehicle speed threshold and greater than said second vehicle speed threshold, and said road roughness indicative signal value is greater than said reference value.

12. The suspension control system as set forth in claim 11, wherein said given reference value is variable between a first highest value, a second lowest value and a third medium value, and said controller selects said first highest value when said second sensor signal value is smaller than said first vehicle speed threshold and greater than said second vehicle speed threshold, said second lowest value when said second sensor signal value is smaller than said second threshold, and said third medium value when said second sensor signal value is greater than said first threshold.

13. The suspension control system as set forth in claim 11, wherein said controller derives an averange value of said first sensor signal values and a dfference of said avarage value and current first sensor signal value, which difference serves as said roughness indicative value.

14. A method for controlling damping characteristics of an automotive vehicle suspension system which includes a variable-damping-characteristics daming means, comprising the steps of:
  monitoring roughness of a road surface and producing a road roughness indicative signal having a value variable depending upon roughness of the road
  monitoring vehicle driving speed and producing a vehicle speed indicative signal having a value proportional to the vehicle speed
  comparing said vehicle speed indicative signal value with a first higher speed threshold and a second lower vehicle speed threshold for distinguishing whether said vehicle speed is within a predetermined vehicle speed range defined by said first and second speed threshold
  controlling said variable-damping-characteristics into a first soft suspension mode when said roughness indicative signal value is smaller than a given reference value, into a second hard suspension mode when said roughness indicative signal value is greater than said reference value and said vehicle speed is out of said predetermined range, and into a third medium mode which has damping characteristics intermediate between said first soft mode and second hard mode, when said roughness indicative signal value is greater than said reference value and said vehicle speed is within said predetermined range.

15. The method as set forth in claim 14, wherein said roughness of the road surface is m,onitored by detecting relative distance between a vehicle body and the road surface.

16. The method as set forth in claim 15, wherein said road roughness is determined by monitoring fluction of the distance between said vehicle body and said road surface.

17. The method as set forth in claim 16, wherein for detecting fluction of said distance value, an average value of said distance value is derived and compared with an instantaneous distance value for obtaining the difference therebetween, and said difference serves as said road roughness indicative value.

* * * * *